Jan. 5, 1954   G. C. M. PARMENTIER   2,664,712
FLUID TIGHT PACKING FOR GATES
Filed Feb. 14, 1951   3 Sheets-Sheet 1
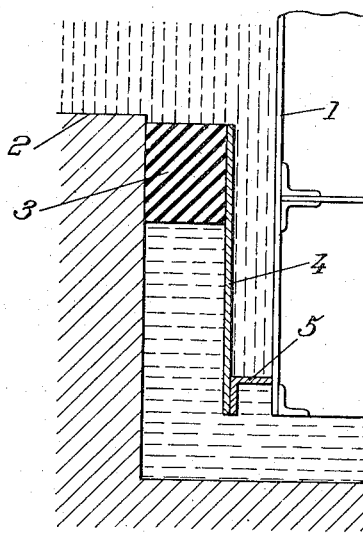
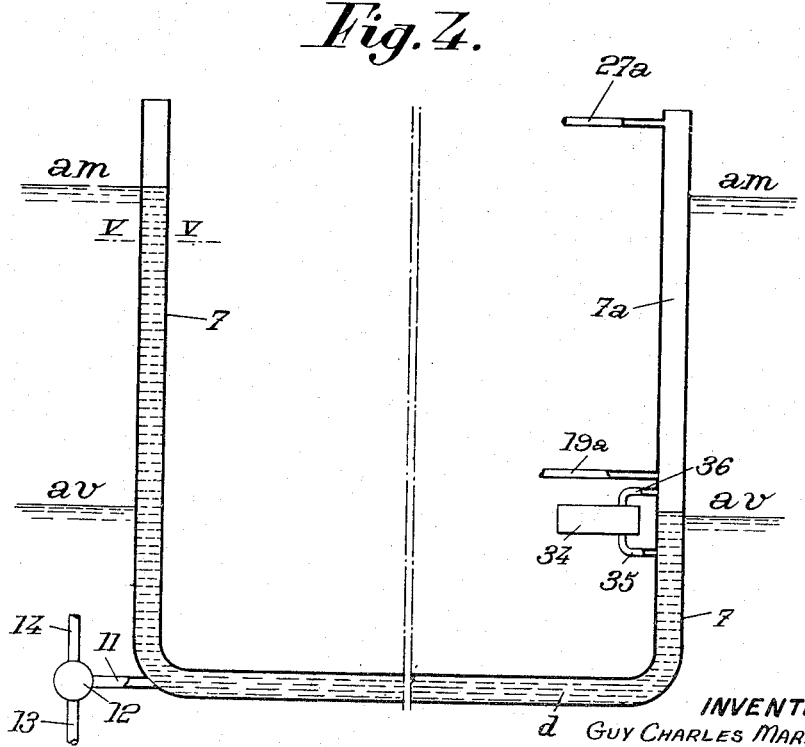
INVENTOR
Guy Charles Marie Parmentier
BY
Bailey, Stephens & Huettig
ATTORNEYS Jan. 5, 1954 G. C. M. PARMENTIER 2,664,712
FLUID TIGHT PACKING FOR GATES
Filed Feb. 14, 1951 3 Sheets-Sheet 2

INVENTOR
GUY CHARLES MARIE PARMENTIER
BY
Bailey, Stephens & Huettig
ATTORNEYS

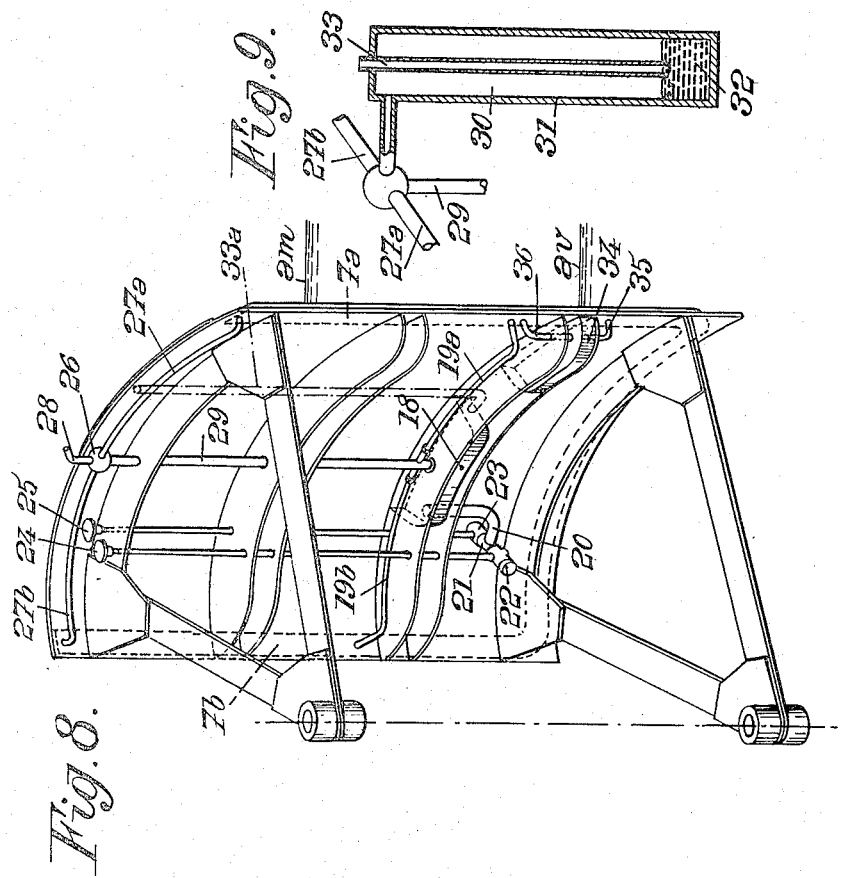
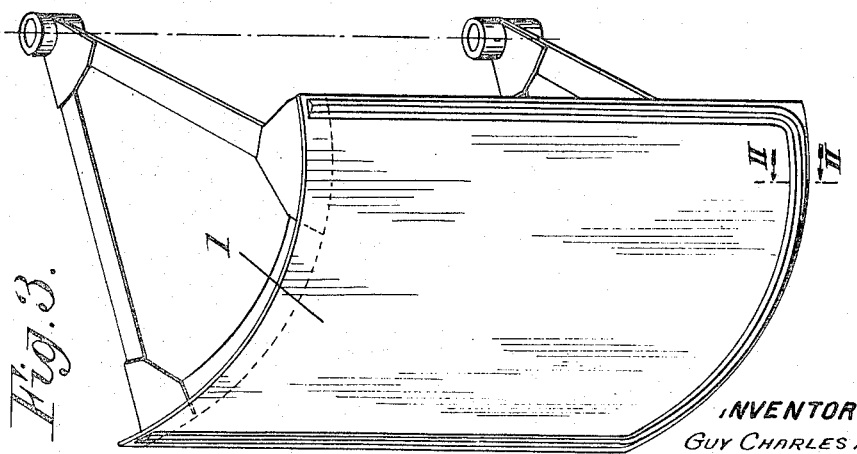

Patented Jan. 5, 1954

2,664,712

UNITED STATES PATENT OFFICE 2,664,712

FLUID TIGHT PACKING FOR GATES

Guy Charles Marie Parmentier, Vaucresson, France

Application February 14, 1951, Serial No. 210,881

Claims priority, application France February 17, 1950

11 Claims. (Cl. 61—22)

1

The present invention relates to fluidtight packing means and especially, but not exclusively, packing devices for achieving fluidtightness of gates, partitions and the like, for instance for locks, coffer dams, etc. . . .

The object of my invention is to provide a packing device of this kind which is better adapted to meet the requirements of practice than those used for the same purposes up to this time.

Preferred embodiments of my invention will be hereinafter described with reference to the accompanying drawings, given merely by way of example and in which:

Fig. 1 diagrammatically shows the construction of a known lock gate.

Fig. 2 diagrammatically shows, in vertical section, the lower portion of a lock gate provided with a packing device according to my invention.

Fig. 3 is a perspective view of such a lock gate.

Fig. 4 is a diagrammatical view the right hand and left hand sides of which show different embodiments of a lock gate packing device according to my invention.

Fig. 8 is a perspective view of a lock gate provided with a packing device according to my invention including inflating means made according to the right hand side of Fig. 4.

Fig. 9 is a diagrammatical view of an element of the structure of Fig. 8.

Figure 2:
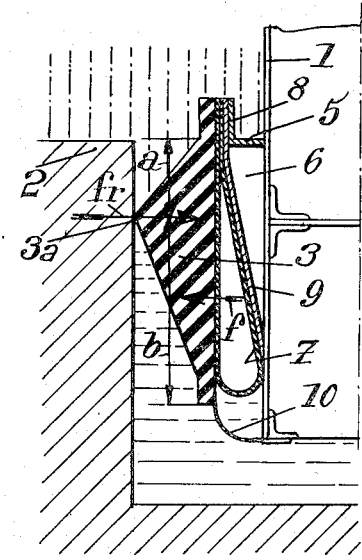
Figure 5:
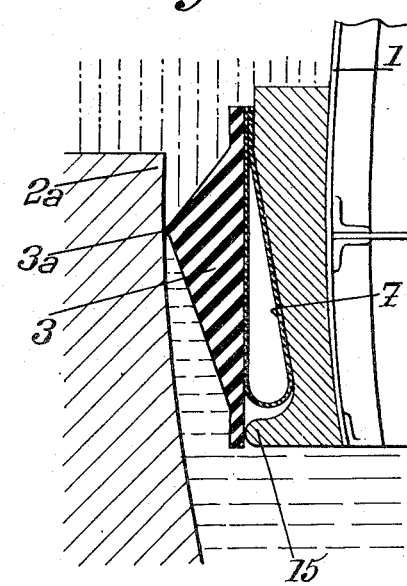
Figs. 5, 6 and 7 show, in section on the line V—V of Fig. 4, three modifications of a packing device according to my invention.

I will first remind how watertightness is obtained in lock gates of known construction, as shown by Fig. 1.

Reference numeral 1 designates the bottom part of the gate, and 2 the bottom of the lock, which is hollowed out to accommodate the lower edge of said gate. Leakage between the upstream side and the downstream side is prevented by the provision of a packing member 3 carried by an elastic arm 4 fixed at 5 to gate 1. High pressure, or upstream pressure, prevails in the space marked by vertical hatching, whereas low pressure, or downstream pressure prevails in the space marked by horizontal hatching. With this arrangement, the upstream pressure exists in the space between supporting arm 4 and gate 1, so as strongly to apply packing member 3 against the vertical wall of the groove provided in the bottom of the lock for the gate bottom edge. This upstream pressure therefore achieves a good water tightness but it makes it difficult to operate the gate because of the friction it involves between member 3 and the masonry wall. Furthermore,

2 this friction determines quick wear and tear of member 3.

According to my invention, in order to avoid these drawbacks, packing member 3 is fixed to one of the two parts between which it is to achieve fluidtightness (these parts being gate 1 and the wall of the lock), say to gate 1, along its edge subjected to the upstream pressure. Thus, the space 6 (see Fig. 2) between packing member 3 and gate 1 is no longer subjected to the direct action of the upstream pressure.

Furthermore, according to my invention, means are provided in this space 6, preferably in the form of an air or water inflatable chamber 7, for exerting a pressure on the rear face of packing member 3, this pressure being normally (i. e. as long as the device is to perform the desired packing function) higher than the downstream pressure and preferably equal to the upstream pressure, and temporarily, i. e. when the gate is to be moved and accordingly packing pressure is to be relieved) equal to or lower than the downstream pressure.

Finally, still according to my invention, packing member 3 is given in cross section a shape such that it forms toward the other part (i. e. the masonry wall) a ridge or rib 3a applied against said wall along a narrow band substantially parallel to the fixation edge of packing member 3. The distance of ridge 3a from said fixation edge is smaller than the width of chamber 7 so that most of the pressure forces applied to the rear face of member 3 are located beyond said ridge 3a from the fixation edge.

In the examples of my packing device shown by Figs. 2 and 5 to 7, member 3 is of substantially triangular cross section. Its fixation edge, secured to a part 8 rigid with gate 1, is flat. Member 3 is made of a plastic or elastic material, for instance rubber. The fact that its flat edge is secured to supporting part 8 enables it to swing about an axis running along said fixation edge.

Inside space 6, I provide an oblique wall 9 against which the rear wall of chamber 7 is applied. Preferably, this chamber 7 is also made of rubber and the space inside this chamber can be connected either with the water on the upstream side of the gate (high height water column) or with the water on the downstream side of said gate (low height water column).

Ridge 3a is preferably nearer to the fixation edge of member 3 than to the other edge of said member. In the examples illustrated by the drawings, it is at about one third of the width of member 3 from the fixation edge thereof.

Fluidtight packing is obtained when the pressure inside chamber 7 is higher than the downstream pressure, for instance when it is equal to the upstream pressure. Thus, practically the whole of the area of the back face of member 3 is subjected to the upstream pressure, tending to apply said member against masonry wall 2. The upstream pressure acts in the opposite direction upon the portion $a$ of member 3, and the downstream pressure also acts in this opposite direction upon portion $b$ of member 3. The resultant of these pressure forces is a force $f$ which applies member 3 against the masonry wall 2 and achieves fluidtight packing as long as the pressure inside chamber 7 is the upstream pressure. It should be noted that the lever arm of force $f$ with respect to edge 8, considered as a pivot axis, is greater than the lever arm of reaction force $f_r$ which tends to crush the edge of ridge $3a$ against the masonry wall. Consequently $f_r$ is greater than $f$, i. e. the device according to the invention multiplies the effort by means of which the packing member is crushed against the masonry wall.

When it is desired to open the gate, the pressure is relieved in chamber 7, for instance down to the downstream pressure. This automatically causes the packing member to detach from the masonry wall, since the forces applied upon the front face of said member become greater than those acting on the rear face thereof. The gate can then be opened without difficulty and without any detrimental friction of the packing member against the masonry wall.

It should further be noted that, according to Fig. 2, there is provided, between the lower edge of packing member 3 and gate 1 proper, a flexible, non fluidtight, rubber protection strip 10, which serves merely to limit the maximum displacement of the packing member, without otherwise exerting an action on the working of the packing device.

Of course, the packing member as shown by Fig. 2 is to run along all the sides of the gate where fluidtightness is necessary. As a rule, these sides are the bottom one and the two side ones. Thus Fig. 3 diagrammatically shows a gate rotating about a vertical axis and constituted by a cylindrical sector 1. The packing member runs along the circular bottom edge and the two vertical side edges of the gate.

In order to obtain inside chamber 7 the pressure necessary to achieve fluidtightness, water from the upstream side of the gate may be admitted directly into said chamber 7, this water being evacuated toward the downstream side when the packing member is to be detached from the masonry wall. Such a construction is diagrammatically illustrated by the left-hand side of Fig. 4, which corresponds to a packing member arranged as shown by Fig. 3.

In this case, a conduit 11 opens into chamber 7, and this conduit 11 can be connected, through a cock 12, either with a conduit 13 communicating with the water on the upstream side of the gate or with a conduit 14 communicationg with the water on the downstream side. Each of these conduits 13 and 14 preferably dips to the bottom of the channel. In this embodiment, the upper end of chamber 7 is open to the atmosphere so that air can freely enter or leave this chamber. When chamber 7 is connected with the upstream side, water rises in this chamber up to the upstream water level, shown by line $am$, and when chamber 7 is connected with the downstream side, water drops in said chamber 7 down to the downstream level $av$.

Of course, the water pressure in the portions of chamber 7 close to the level $am$ is relatively low and may be insufficient to achieve satisfactory fluidtightness for the corresponding portions of the packing member. In order to reinforce the pressure with which the packing member is applied against the masonry wall, I may have recourse to supplementary elastic means. For instance, I may provide a kind of heel 15 (Fig. 5) which is applied against the edge of the packing member opposed to the fixation edge thereof. The dimension of this heel 15 is such that it presses, by slightly deforming packing member 3, the ridge $3a$ thereof against the masonry wall $2a$. The pressure thus mechanically exerted upon ridge $3a$ to apply it against wall $2a$ is then added to the hydraulic pressure of the water column inside chamber 7.

Figure 6:
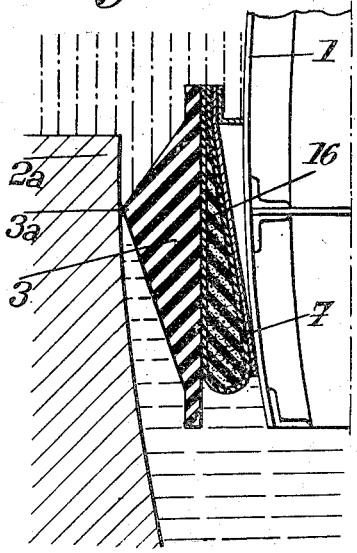
Figure 7:
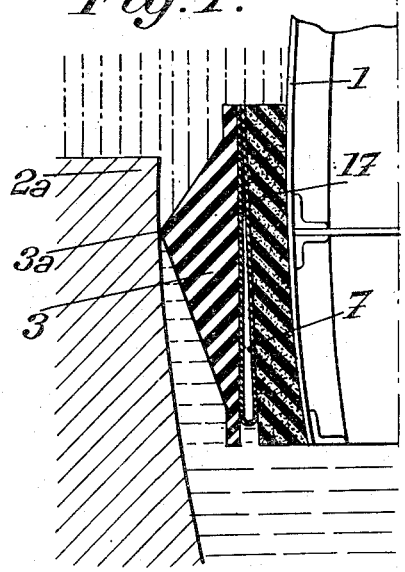

An analogous effect is obtained with the construction of Fig. 6. In this case, I dispose, inside chamber 7, elastic means, for instance pieces of spongy rubber 16, for exerting upon packing member 3 a pressure which is added to the hydraulic pressure. A similar result is obtained with the construction of Fig. 7, in which a sheet of spongy rubber 17 is interposed between gate 1 and the rear wall of chamber 7.

Instead of causing the upstream water column to rise in chamber 7 up to level $am$, I may inflate at least the upper parts of this chamber 7 by means of air compressed by the upstream water column. For this purpose, for instance, I close the upper ends of chamber 7, so as to entrap the air present in this chamber. In this case, the height of water in chamber 7 is below that of the upstream water column as it is subjected to the action of the air compressed in the upper portions of this chamber. Advantageously, these portions of chamber 7 are provided with a check valve which opens only in the direction for which air enters chamber 7 from the outside. Of course, in this case, the supplementary elastic means above described become unnecessary since the air pressure is uniform in the upper part of chamber 7.

According to another feature of my invention, practically all of the part of chamber 7 which is located above level $av$ is filled with air compressed by the upstream water column. Thus the pressure with which the packing member is applied against the masonry wall is uniform on all the length of said member which corresponds to this part of chamber 7, i. e. which is located above the downstream water level. The right hand portion of Fig. 4 and Figs. 8 and 9 diagrammatically show a construction based upon this feature.

As shown by Fig. 4, in order to obtain a fluidtight packing, chamber 7 is filled with a liquid $d$ (preferably water) up to level $av$, this liquid mass being in communication with the upstream water column, and air is entrapped in the part of chamber 7 above this level $av$.

According to this embodiment of my invention, I provide at level $av$ or just above this level, an air chamber 18 of large horizontal cross section area but of small height. The location and height of chamber 18 are chosen in such manner that if it is placed in communication with downstream water column (level $av$), water does not fill up this chamber but stops at the level of the bottom thereof or slightly above this bottom. The top part of this chamber 18 (located just slightly above level *av*) communicates, through conduits 19a and 19b, with the air chambers 7a and 7b corresponding to the portions of the vertical branches of chamber 7 located above level *av*. The bottom portion of chamber 18 can be connected, through a conduit 20 and a valve system 21, either with the downstream water column (level *av*) or with the upstream water column (level *am*). This valve system includes two valves 22 and 23 controlled respectively by hand wheels 24 and 25 and connected through tubes, not shown, respectively with the water on the downstream side of the gate and with the water on the upstream side.

The upper ends of air chambers 7a and 7b may be connected with the atmosphere through a valve, either automatic or hand operated. Such a valve is diagrammatically shown on Fig. 8 at 26. It communicates with the upper ends of chambers 7a and 7b through conduits 27a and 27b and its communication with the atmosphere can take place through a tube 28. Finally, this valve communicates advantageously with the top of air chamber 18 through a tube 29. When this valve 26 is hand operated, it is preferably ganged with valves 22 and 23 so that valve 26 cuts off communication with the atmosphere when valve 23 is opened to place chambers 7a and 7b under the upstream water pressure, while valve 26 is opened to the atmosphere when valve 22 is opened to relieve the pressure in chambers 7a and 7b down to the downstream water pressure.

As above stated, valve 26 may be automatically operated, for instance as shown by Fig. 9. In this case, the three conduits 27a, 27b and 29 communicate with the space 30 inside a tube 31, above a mass of mercury 32 provided at the bottom of this tube 31. Inside tube 31, there is provided a narrow tube 33, the upper end of which communicates with the atmosphere, whereas its lower end is immersed in the mass of mercury. When the pressure prevailing in chambers 7a and 7b is the upstream pressure, mercury rises in tube 33 and thus cuts off communication between chambers 7a and 7b and the atmosphere. On the contrary, if chambers 7a and 7b are placed in communication, through valve 22, with the downstream water column, mercury drops in tube 33 and lets air flow into chamber 30 and through tubes 27a, 27b and 29 into chambers 7a, 7b and 18.

According to a modification (shown in dot-and-dash lines on Fig. 8), the mercury valve is replaced by a pipe 33a having its lower end connected with the lower portion of chamber 18 and its upper end open to the atmosphere at a level higher than level *am*. When the packing device is placed under pressure, water rises in this pipe 33a and thus keeps it closed, whereas said tube is emptied when the pressure inside the packing device is relieved.

I further provide, at level *av*, a small chamber 34 connected, immediately above and below the level of liquid *d*, with chamber 7 through tubes 35 and 36 respectively. This chamber 34 is intended to reduce the variations of level of liquid *d* when the packing device is placed under and out of pressure. In order to prevent freezing of liquid *d*, an anti-gel product may be added thereto, or heating means (not shown) may be provided.

Operation of the device shown by the right hand side of Fig. 4 and Figs. 8 and 9 takes place as follows:

When valve 23 is opened to connect chamber 7 with the column of water at upstream level, water rises but little in chamber 18, due to the large horizontal cross section of this chamber. Anyway, the air in chambers 7a and 7b is compressed to a value corresponding to the upstream pressure before water reaches the level of tubes 19a and 19b. Water therefore does not enter chambers 7a and 7b as long as these chambers present no leaks.

If, for some reason, a leak exists, water, contrary to what constitutes the normal operation of the device, enters, through tubes 19a and 19b, chambers 7a and 7b and places these chambers under pressure in the fashion above described with reference to the left hand side of Fig. 4. Therefore, in any case, the packing device performs its function.

In order to relieve the pressure in chamber 7, valve 23 is closed and valve 22 is opened and air is simultaneously allowed to enter into chambers 7a, 7b and 18.

Of course, the device according to my invention is not in any way limited to its application to lock gates as above described, but may be used to achieve a fluidtight separation between the opposite sides, at different respective pressures, of gates, partitions and the like.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A packing device for ensuring a fluidtight joint between two parts movable with respect to each other and separating a high pressure space on the upstream side of said joint from a low pressure space on the downstream side thereof, this device including a packing member in the form of a strip of a flexible material carried by one of said parts and including a ridge adapted to bear against the other part so as to form a separation between the space on the upstream side and the space on the downstream side, said strip being fixed to the first mentioned part along its edge located on the upstream side of the joint and said ridge extending in a direction at least substantially parallel to that of said strip and being located nearer to the fixation edge than to the other edge thereof, an inflatable chamber interposed between the rear face of said packing strip and said first mentioned part, and means for placing the inside of said inflatable chamber under different pressures at will.

2. A packing device for ensuring a fluidtight joint between two parts movable with respect to each other and separating a high pressure space on the upstream side of said joint from a low pressure space on the downstream side thereof, this device including a packing member in the form of a strip of a flexible material carried by one of said parts and including a ridge adapted to bear against the other part so as to form a separation between the space on the upstream side and the space on the downstream side, said strip being fixed to the first mentioned part along its edge located on the upstream side of the joint and said ridge extending in a direction at least substantially parallel to that of said strip and being located nearer to the fixation edge than to the other edge thereof, an inflatable chamber interposed between the rear face of said packing strip and said first mentioned part, and control means for placing the inside of said inflatable chamber under either the upstream high pressure or the downstream low pressure.

3. A packing device for ensuring a watertight joint between two parts movable with respect to each other and separating water at a high level on he upstream side of said joint from water at a low level on the downstream side of said joint, this device comprising in combination a packing member in the form of a strip of a flexible material carried by one of said parts and including a ridge adapted to bear against the other part so as to form a separation between the upstream side water and the downstream side water, said strip being fixed to the first mentioned part along its edge located on the upstream side of the joint and said ridge extending in a direction at least substantially parallel to that of said strip and being located nearer to the fixation edge than to the other edge thereof, an inflatable chamber interposed between the rear face of said packing strip and said first mentioned part, the parts of said inflatable chamber above the downstream water level being in constant communication with the atmosphere, and means for connecting said chamber at will either with the water on the upstream side or with the water on the downstream side.

4. A packing device according to claim 3 further including supplementary elastic means for urging toward the second mentioned part the portions of the ridge of said strip located close to the upstream water level.

5. A packing device for ensuring a watertight joint between two parts movable with respect to each other and separating water at a high level on the upstream side of said joint from water at a low level on the downstream side of said joint, this device comprising in combination a packing member in the form of a strip of a flexible material carried by one of said parts and including a ridge adapted to bear against the other part so as to form a separation between the upstream side water and the downstream side water, said strip being fixed to the first mentioned part along its edge located on the upstream side of the joint and said ridge extending in a direction at least substantially parallel to that of said strip and being located nearer to the fixation edge than to the other edge thereof, an inflatable chamber interposed between the rear face of said packing strip and said first mentioned part, means for cutting off the parts of said inflatable chamber above the downstream water level from the atmosphere, and means for connecting the lower part of said chamber at will either with the water on the upstream side or with the water on the downstream side.

6. A packing device for ensuring a watertight joint between two parts movable with respect to each other and separating water at a high level on the upstream side of said joint from water at a low level on the downstream side of said joint, this device comprising in combination a packing member in the form of a strip of a flexible material carried by one of said parts and including a ridge adapted to bear against the other part so as to form a separation between the upstream side water and the downstream side water, said strip being fixed to the first mentioned part along its edge located on the upstream side of the joint and said ridge extending in a direction at least substantially parallel to that of said strip and being located nearer to the fixation edge than to the other edge thereof, an inflatable chamber interposed between the rear face of said packing strip and said first mentioned part, means for cutting off the parts of said inflatable chamber above the downstream water level from the atmosphere, a water chamber of large horizontal cross section and small height carried by said first mentioned part having its horizontal bottom substantially at the downstream water level and its top at a small distance above this water level, the top part of this last mentioned water chamber being in communication with the inflatable chamber, and tube and valve means for connecting the lower part of this water chamber either with the upstream water or with the downstream water.

7. A packing device according to claim 6 in which the part of the inflatable chamber below the downstream water level is constantly filled with liquid.

8. A packing device according to claim 6 further including valve means for connecting the top part of the inflatable chamber with the atmosphere when said water chamber is not in communication with the upstream water mass.

9. A packing device according to claim 6 further including valve means for connecting the top part of the water chamber with the atmosphere when said water chamber is not in communication with the upstream water mass.

10. A packing device according to claim 6 further including valve means for connecting the top part of the inflatable chamber with the atmosphere when said water chamber is not in communication with the upstream water mass, said valve means being an automatic mercury valve.

11. A packing device according to claim 6 further including an upward pipe connected at the lower end thereof with the upper part of said water chamber and the upper end of which extends to a level above the upstream water level.

GUY CHARLES MARIE PARMENTIER.

References Cited in the file of this patent

UNITED STATES PATENTS

| Number | Name | Date |
|---|---|---|
| 2,045,825 | Becher | June 30, 1936 |
| 2,132,307 | Martin | Oct. 4, 1938 |

FOREIGN PATENTS

| Number | Country | Date |
|---|---|---|
| 399,021 | Germany | of 1924 |
| 107,644 | Australia | of 1927 |